United States Patent [19]
Uechi

[11] 3,867,578
[45] Feb. 18, 1975

[54] ADAPTER FOR AUTOMATIC TELEPHONE ANSWERING DEVICES PERMITTING REMOTE MONITORING OF RECORDED MESSAGES

[75] Inventor: Francis Y. Uechi, New Berlin, Wis.

[73] Assignee: GTE Automatic Electric Laboratories Incorporated, Northlake, Ill.

[22] Filed: Sept. 28, 1973

[21] Appl. No.: 401,800

[52] U.S. Cl. .................................................. 179/6 E
[51] Int. Cl. ........................ H04m 11/00, G11b 5/00
[58] Field of Search ............................. 179/6 R, 6 E

[56] References Cited

UNITED STATES PATENTS

| | | | |
|---|---|---|---|
| 3,136,856 | 6/1964 | Zimmermann | 179/6 E |
| 3,293,365 | 12/1966 | Mitsui | 179/6 E |
| 3,337,690 | 8/1967 | Martin | 179/6 E |
| 3,511,935 | 5/1970 | Mizuno | 179/6 E |
| 3,794,764 | 2/1974 | Todd | 179/6 E |

*Primary Examiner*—James W. Moffitt
*Assistant Examiner*—Stewart Levy
*Attorney, Agent, or Firm*—Robert J. Black

[57] ABSTRACT

An adapter circuit for use with an automatic telephone answering and message recording machine. The adapter permits a subscriber equipped with a portable tone generator to playback and review recorded messages from a remote location. Control of the tape rewind is also done from the remote location.

6 Claims, 1 Drawing Figure

PATENTED FEB 18 1975
3,867,578
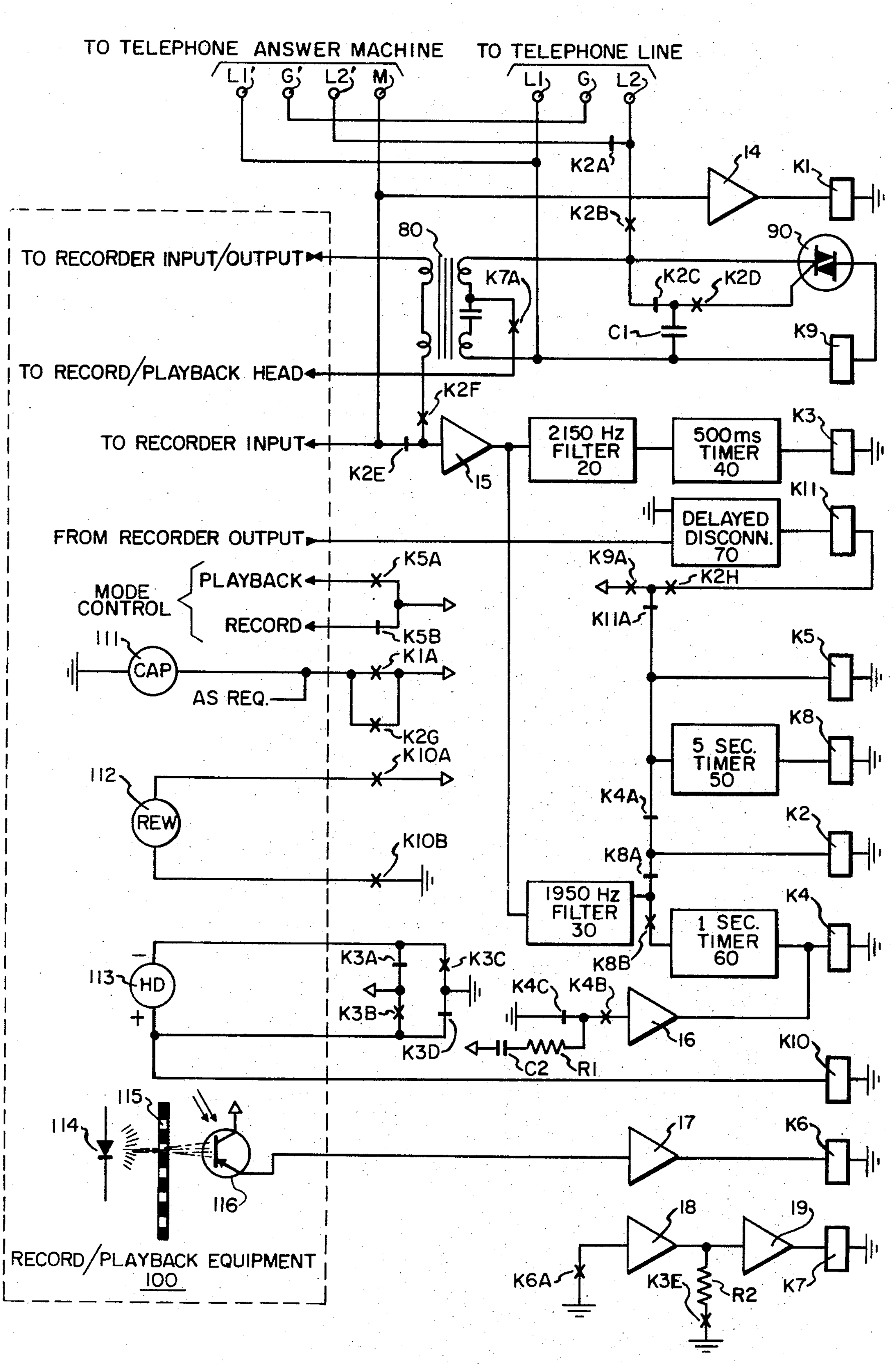

ADAPTER FOR AUTOMATIC TELEPHONE ANSWERING DEVICES PERMITTING REMOTE MONITORING OF RECORDED MESSAGES

BACKGROUND OF THE INVENTION

1. Field of the Invention

This invention relates to automatic telephone answering and message recording machines and more particularly to an adapter for use with such machines that permits the user to monitor incoming received messages from a remote location.

2. Description of the Prior Art

Telephone answering and message recording devices, or machines, are well known. Such machines function during the absence of a local subscriber, or when a telephone is otherwise unattended to recognize and automatically acknowledge incoming calls to the telephone, to transmit an advisory or informative message to the calling party appraising him of the fact that the called subscriber is not available, and that the telephone line is equipped with facilities for recording a message if the calling party cares to transmit one, and to record any message transmitted by the calling party for subsequent reproduction of the local called station.

Some telephone answering and recording machines are also equipped to transmit messages recorded by the machine to a remotely located subscriber who is aware of the machine being equipped with this particular capability. Telephone answering and recording machines equipped for remote review of received recorded messages are disclosed in U.S. Pat. Nos. 3,337,690, 3,715,506, 3,730,997 and 3,736,380.

It will be obvious that telephone answering and recording machines that are equipped for remote access to messages recorded therein, of necessity include substantial portions of additional circuitry and equipment to facilitate the remote control operation. This inclusion of remote control equipment in a conventional telephone answering and recording machine, substantially increases the cost thereof. Accordingly, it is the object of the present invention to provide an adapter unit which may be added to conventional automatic telephone answering and message recording machines where such a requirement exists. By this means the need for special machines including remote control is eliminated and manufacturers may standardize on a conventional machine, providing the adapter unit only where the requirements for such exists.

SUMMARY OF THE INVENTION

The present invention is an adapter unit for use with an automatic telephone answering and message recording machine such as that manufactured by GTE Automatic Electric Incorporated and designated Model No. 985. The adapter unit provides a facility whereby the machine may be remotely accessed through the telephone switching network by a subscriber who is provided with a small oscillator unit capable of generating two different audio tones. The adapter unit is connected between the subscriber's telephone line and the conventional answering machine. It includes a tape recorder and playback mechanism of essentially conventional design modified in accordance with the requirements of the present invention. Also included in the adapter is the necessary control circuitry to permit access of the information recorded by the tape recorder from a remote location.

During normal operation of the associated telephone answering machine, the present adapter circuit functions only during the recording of incoming messages. At that time it records incoming messages on a separate tape simultaneously with the recording of incoming messages in the associated answering machine. Alternately the tape cassette or reel, may be removed from the associated answering machine and the present adapter only provides the required recording media. Of course the answered tape cartridge or reel is still retained in the associated telephone answering machine.

When a subscriber wishing to review the material recorded by the answering machine and/or the adapter, accesses the present adapter and associated answering machine, the answering machine functions in the usual manner transmitting a message requesting the caller to give his name, and dictate his recording. After such a message is given the the telephone answering machines goes through what is conventionally known as a midcycle shift and prepares itself for the recording mode. At this time the subscriber may transmit a verbal marking message such as date, time of day, etc., and then by means of a small audio oscillator placed next to the transmitter of the telephone he is using, transmits an audio signal tone of a first frequency to the telephone answering machine. By means of a monitor connection to the answering machine, the adapter detects the recorded message first applying power to the adapter circuit and then detects the incoming signal tone and placing the adapter in the playback mode as well as connecting the adapter directly to the telephone line and disconnecting the telephone line from the associated answering machine.

After the above outlined functions are complete, the subscriber will operate his audio oscillator to transmit a second frequency audio tone by means of his telephone transmitter and thus over the telephone network to the present adapter unit. Receipt of the second frequency audio tone by the adapter unit will cause the adapter unit to operate in the rewind mode. As long as the subscriber transmits the tone the machine will continue to rewind the recording tape cassette or reel. When the end of the reel is reached while tone is still being transmitted, an identifying signal indicating completion of rewind is transmitted back to the subscriber.

When the subscriber removes the second audio tone the adapter circuit will revert to the playback mode and transmit over the telephone line, for receipt by the subscriber accessing the adapter, all messages recorded on the cassette or reel of tape included in the adapter unit. Upon hearing the last message or the recorded marker message that the subscriber himself placed on the message recording tape, the adapter may be released or disconnected by either a re-operation of the subscriber's audio oscillator to again transmit the first tone, or simply by hanging up the telephone or alternately by a one minute period of silence. After any of the above, both the adapter and associated answering machine revert back to the standby mode ready for receipt of more incoming calls.

It should also be obvious from the above that the subscriber may stop the playback of recorded messages at any point during their playback by operation of the audio generator to transmit its first tone, and then rewind the tape for short periods by application again of the second audio tone. In this manner specific individual recorded messages may be reviewed as required.

BRIEF DESCRIPTION OF THE DRAWING

The single sheet of drawings appended hereto comprise a functional circuit diagram of an adapter unit for use with automatic telephone answering and message recording machines, in accordance with the present invention.

DESCRIPTION OF THE PREFERRED EMBODIMENT

Referring now to the accompanying sheet of drawings it should be noted that the detailed circuitry of certain portions of the present invention including filters, amplifiers, relay drivers, etc. have not been shown in detail inasmuch as the detailed circuitry thereof does not form a portion of the present invention. Rather any circuit meeting the functional requirements as will be described hereinafter may be employed.

It should also be noted that the details of the record/playback equipment 100 has only been shown in sufficient detail to understand the control circuitry of the present invention. Record/playback equipment 100 is essentially conventional in nature and accordingly the details thereof have been omitted.

Referring again to the drawing the adapter circuit of the present invention is connected to the telephone line at terminals designated L1, G and L2. Also connected to the present adapter at terminal L1′, G′, L2′ and M is a conventional telephone answering and recording machine such as Model No. 985 manufactured by GTE Automatic Electric Incorporated.

The best understanding of the present invention may be had by reference to the following description in which recording of a conventional incoming message will be described, followed by a description of the sequence of operations that take place when a telephone line to which the present adapter and associated answering machine are connected is accessed by a telephone subscriber equipped with an appropriate audio oscillator or generator for effecting the remote control over the present adapter circuitry.

When an incoming ringing signal, signalling receipt of an incoming call is received over telephone line conductors L1 and L2 the incoming ringing signals are coupled via terminals L1′ and L2′ directly to the associated telephone answering machine. In the usual manner the answering machine will recognize the incoming ringing signal go to an "off hook" condition and transmit a prerecorded message to the subscriber who has accessed the line. This message conventionally will advise the accessing subscriber that his call has been answered by a telephone answering and recording machine and that if he wishes to leave a message, he may do so after hearing a characteristic signal.

Assuming the subscriber accessing the line wishes to leave a message, the incoming message received over the telephone line will be recorded by the telephone answering machine. At the same time through terminal M connected to the telephone answering machine and specifically to the record amplifier of the telephone answering machine a monitor pickup is connected to the present adapter unit. The receipt of an incoming signal on the lead connected to terminal M at the adapter will cause operation of relay K1 through associated relay driver 14. Operation of relay K1 at associated contacts K1A will apply power to the capstan motor 111 of record/playback equipment 100. Since record/playback equipment 100 is normally in the record mode, incoming signals over the monitor lead which is also connected to the recorder input, will be recorded in a conventional manner. At the conclusion of the message, a signal will no longer be present on the lead connected to terminal M and relay K1 will restore removing power at contacts K1A from capstan motor 111, terminating the recording operation of record/playback equipment 100. In this manner all incoming messages will be recorded.

It should be noted that since the associated telephone answering machine normally also contains a tape for recording of incoming messages, that both telephone answering machine and the present associated adapter are simultaneously recording the same incoming message. Some advantage may exist in this mode as messages recorded in the associated answering machine may be retained by removal of the included cassette or tape reel and replacement thereof with an unused tape. Alternately the tape cassette or reel utilized for the recording of incoming messages in the associated answering machine may be removed initially and recording will occur only in the adapter of the present invention.

Assuming now that the telephone line connected to the adapter of the present invention and the associated telephone answering machine is accessed by a subscriber who from his remote location wishes to review the incoming messages recorded by the present adapter. As described previously the incoming ringing signal will activate the telephone answering machine causing it to transmit an initial announcement, followed by a midcycle shift after which the telephone answering machine goes into the record mode. At this time the subscriber who is accessing the adapter and telephone answering machine will verbally give a marker message such as the time of the call, date, etc. When the midcycle shift occurred in the telephone answering machine, the monitor output would have been activated and accordingly relay K1 will have operated placing the record playback equipment in operation in the manner previously described. The subscriber's incoming message will be recorded by the telephone answering machine if equipped with a recording tape, and likewise it will be recorded by the adapter unit.

After giving the marker message the subscriber will operate his portable audio tone generator, placing it in proximity to the telephone transmitter over which he has been speaking and operating it selectively to generate a first tone which in the present preferred embodiment would be 1950Hz. Upon receipt at the adapter of the 1950Hz tone signal taken from the monitor of the answering machine, the tone will be amplified by amplifier 15 and extended through 1950Hz filter 30 to relay K2 causing it to operate. At the same time the incoming tone will also be recorded by the record/playback equipment 100 by virtue of application of the 1950Hz signal to the recorder input.

Operation of relay K2 at contacts K2A will disconnect the telephone line from the associated telephone answering machine and connect it at contact K2B to the adapter circuit and particularly to the winding of transformer 80. At the same time the incoming signal will through contacts K2C and K2D be applied to the gate of triac 90 causing it to be rendered conductive. It should be noted that contacts K2C and K2D of relay K2 comprise a make-before-break combination so that contact K2D operates before K2C providing the gating path for triac 90. When triac 90 operates relay K9 is placed effectively across the line conductors L1 and L2, and will operate as well as providing a line holding load for the telephone line.

Operation of relay K9 at contacts K9A completes an operating path through previously operated contacts K2H to relay K11 which in combination with delayed disconnect circuit 70 will monitor operation of the adapter circuit, to verify that the adapter is in operation and that the calling party has not disconnected or is not transmitting a message or reviewing previously recorded messages on the adapters recording tape.

Operation of relay K2 was also effective at contacts K2G to provide operating potential for the present adapter circuit, which is now required because relay K1 will restore in view of the fact that no output will be available now on the monitor lead from the telephone answering machine, resulting from it being disconnected from the telephone line. At this time the telephone answering machine is no longer operative being disconnected from the telephone line.

After approximately three seconds the calling subscriber will remove the 1950Hz tone. Relay K2 will remain operated over a path from battery extending through contacts K9A, K11A and K4A. After a five second period determined by five second timer 50, relay K8 will operate. At contacts K8A, the initial operating path for relay K2 will be broken and at contacts K8B the output of 1950Hz filter 30 will be connected to one second timer 60. This latter path will be utilized in connection with the receipt of 1950Hz tone for disconnect the details of which will be described later. At the same time that relay K2 operated, relay K5 will also operate and at contacts K5A and K5B change the operate mode of record/playback equipment 100 from the record mode to the playback mode.

At this time the subscriber accessing the adapter circuit of the present invention may reoperate his audio tone generator to transmit a second tone which in the present embodiment is 2150Hz. The incoming 2150Hz tone received at the adapter is coupled through transformer 80 by way of previously operated contact K2F to amplifier 15. In amplifier 15 it is amplified and applied to the input of 2150Hz filter 20 whose output is connected to 500 millisecond timer 40. After 500 milliseconds relay K3 will be operated. In response to operation of relay K3 potential applied through contacts K3A, K3B, K3C and K3D to the head motor or solenoid 113 will be reversed withdrawing the record and playback head that is a portion of of record/playback equipment 100 from contact with the message recording tape, in anticipation of rewinding the tape. At contacts K3E an operating path is prepared for amplifiers 18 and 19 anticipating operating of the rewind alarm relay K7. When the potential is reversed to head motor or solenoid 113 by operation of relay K3, potential is also applied to relay K10 causing it to operate.

In response to operation of K10, at contacts K10A and K10B, potential is applied to rewind motor 112 causing the adapter to go into the rewind mode, rewinding the recording tape. Mechanically attached to the rewind motor shaft is a perforated or slotted disc 115 which rotates axially as the tape is rewound. Positioned on one side of this disc is a light emitting diode 114 and on the other side phototransistor 116. As the message tape is rewound light periodically falls on phototransistor 116 causing (through amplifier 17) operation of relay K6. As long as relay K6 is operated at its contacts K6A ground is applied to the input of amplifier 18 which acts to inhibit the operation of switch 19 and associated relay K7. When the periodic pulses generated by phototransistor 116 are no longer present, relay k6 will restore and relay K7 will operate.

In response to operation of relay K7 a connection is established from the record playback head of record/playback equipment 100 to transformer 80 by contacts K7A. Establishment of this path will cause the record/playback head included in the record/playback equipment 100 to generate a feedback signal which is coupled to the telephone line to terminals L1 and L2. This signal will be recognized by the subscriber accessing the adapter, as indicating that rewind is complete and that the caller should remove the 2150Hz signal from the telephone line.

At this time the caller removes the 2150Hz tone causing relay K3 to restore, which will in turn, cause head motor or solenoid 113 to restore the record playback head of record/playback equipment 100 in contact with the recording tape, as well as restoring relay K10.

The adapter of the present invention is now in the play mode with the capstan motor 111 operated and the record playback head in contact with the recorded message tape. Recorded messages thus are taken from the output from the recorder being coupled through the transformer 80 to the telephone line, connected at terminals L1 and L2. The subscriber may now review all the messages that were recorded including the marker message that he himself recorded shortly after accessing the adapter and its associated telephone answering machine. Upon hearing the marker message, the subscriber will be aware that he has reviewed all of the recorded messages. At this time he will disconnect from the adapter.

Disconnect may be achieved in three different ways. The first and most obvious of these is for the calling subscriber to hang up, (go "on-hook") at the telephone which he has been using to access the adapter. In response to this action (if the telephone system in which the adapter and subscriber are operating in is of the calling party disconnect type) the loop to the central office will be broken removing potential from the central office conducted over the line to terminals L1 and L2 and then through relay K9, from the relay K9 causing it to restore and at associated contact K9A remove the holding potential from relay K2, K8, K5 and K11. In this manner the adapter is restored to its standby condition, as well as reconnecting the associated telephone answering machine to the telephone line, such action also restores the telephone answering machine in the standby condition. When both the telephone answering machine and the associated adapter are in the standby condition, new incoming messages may be recorded or the equipment again accessed for playback of previously recorded messages.

Disconnect may also be effected by the calling subscriber by a reoperation of his tone generator to produce a 1950Hz signal. This signal in the manner previously described will be coupled to 1950Hz filter 30 whose output through contacts K8B is connected to one second timer 60. After a period of one second an output from one second timer 60 will be applied to relay K4 causing it to operate. At contacts K4C and K4B a timing circuit consisting of capacitors C2 and resistor R1 will be connected to the input of amplifier 16 instead of the previously connected ground. This operation will cause relay K4 to be held operated for a predetermined period of time after which relay K4 will release. Prior to the release of relay K4 contacts K4A will operate removing the holding path for relay K2 causing relay K2 to restore.

Restoration of relay K2 will reconnect the telephone answering machine to the telephone line and disconnect the adapter circuit from the telephone line. Release of relay K2 will also disconnect relay K11 and delayed disconnect circuit 70 from the previously prepared operating path. Disconnection of the telephone line from the adapter unit will cause relay K9 to restore which in turn will also cause the other remaining operated relays K5 and K8 to restore. Again the adapter of the present invention and the associated telephone answering machine will be in the standby condition prepared to receive and record additional incoming messages.

If after all messages have been played back and no additional sound has been recorded, delayed disconnect circuit 70 will operate and complete the operating path to relay K11. This circuit is a simple timer circuit that may employ any circuit configuration that applies ground to relay K11 after a predetermined period. In at least one embodiment of the present invention the time constant of this circuit has been established at approximately one minute.

As would be obvious from the foregoing control of the rewind function so as to rewind a portion only of the recorded message tape is possible by shorter applications of the 2150Hz tone since the adapter will automatically go in the playback mode as soon as the 2150Hz tone is removed.

While but a single embodiment of the present invention has been disclosed it will be obvious to those skilled in the art that numerous variations and modifications of the present invention may be made without departing from the spirit and scope of the present invention, which have been limited only by the claims appended hereto.

What is claimed is:

1. In combination a telephone line, a telephone answering and recording machine, said machine initially connected to said telephone line and rendered operated in response to receipt of an incoming call over said telephone line, and an adapter, said adapter including: record and playback equipment operable in record, playback and rewind modes; monitor means connected between said machine and said record and playback equipment, operated in response to said machine receiving an incoming message over said telephone line, to operate said record and playback equipment in the record mode; first signal detection means connected between said monitor means and said record and playback equipment, initially operated in response to receipt of a first tone signal of a first predetermined frequency received over said telephone line, to disconnect said machine from said telephone line, connect said telephone line to said record and playback equipment and operate said record and playback equipment in the playback mode; second signal detection means connected between said telephone line and said record and playback equipment initially operated in response to receipt of a tone signal of a second predetermined frequency received over said telephone line to operate said record and playback equipment in the rewind mode; said second signal detection means further operated in response to termination of said tone signal of said second predetermined frequency to terminate operation of said record and playback equipment in the rewind mode and reoperate said record and playback equipment in the playback mode.

2. The combination as claimed in claim 1 wherein said adapter further includes: rewind alarm means operated in response to said record and playback equipment completing said rewind mode of operation to generate a warning signal indicating completion of said rewind mode and couple said warning signal to said line.

3. The combination as claimed in claim 1 wherein: said first signal detection means initial operation further connects said first signal detection means to said line; said first detection means further operated in response to a second tone of said first predetermined frequency from said telephone line to disconnect said line from said adapter and reconnect said line to said machine.

4. The combination as claimed in claim 1 wherein: said adapter further includes line termination means operated in response to said initial operation of said first signal detection means to connect a terminating impedance to said telephone line.

5. The combination as claimed in claim 1 wherein: said first signal detection means comprise a relay, and a filter circuit designed to couple output signals in response to receipt of signals of said first predetermined frequency, to said relay.

6. The combination as claimed in claim 1 wherein: said second signal detection means comprise a relay, and a filter circuit connected between said telephone line and said relay, operated in response to receipt of signals of said second predetermined frequency to couple an output signal to said relay.

* * * * *